Aug. 11, 1942.   C. W. SINCLAIR ET AL   2,292,669
METHOD OF FORMING CONTAINERS
Filed Oct. 14, 1940   4 Sheets-Sheet 1
FIG.1.
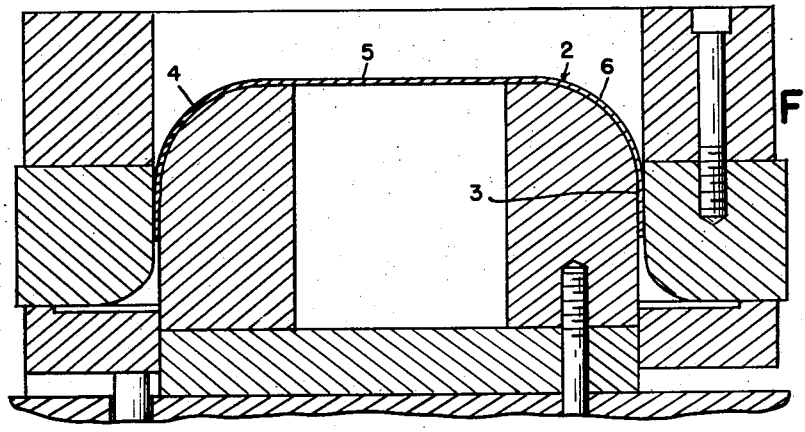
FIG.2.
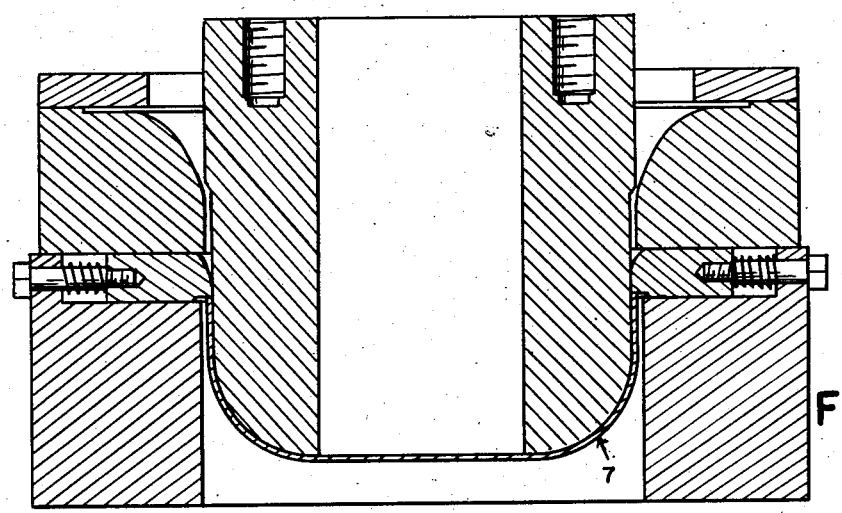
FIG.3.
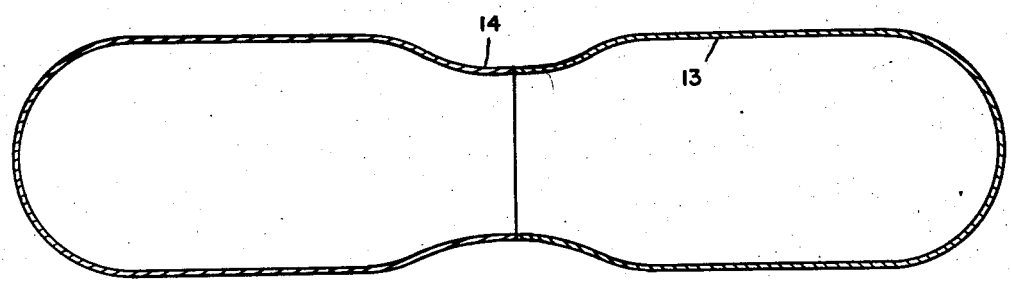
FIG.8.
INVENTORS
CHARLES W. SINCLAIR
FRANK H. Le JEUNE
BY
ATTORNEYS Aug. 11, 1942.  C. W. SINCLAIR ET AL  2,292,669
METHOD OF FORMING CONTAINERS
Filed Oct. 14, 1940   4 Sheets-Sheet 2
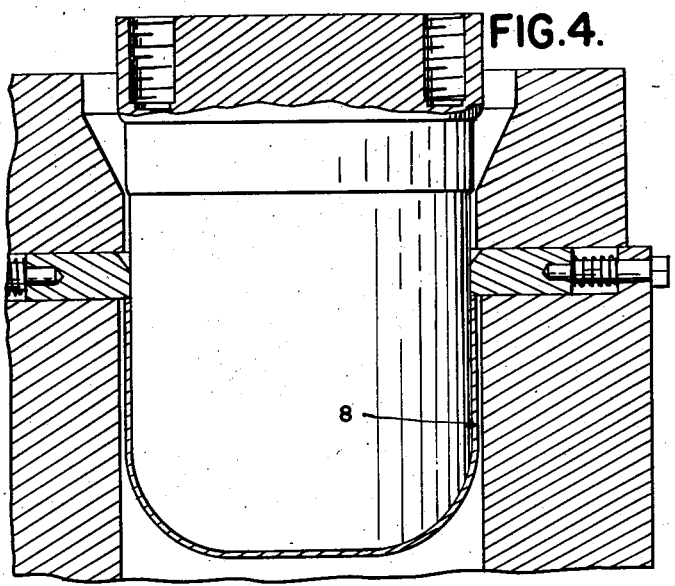
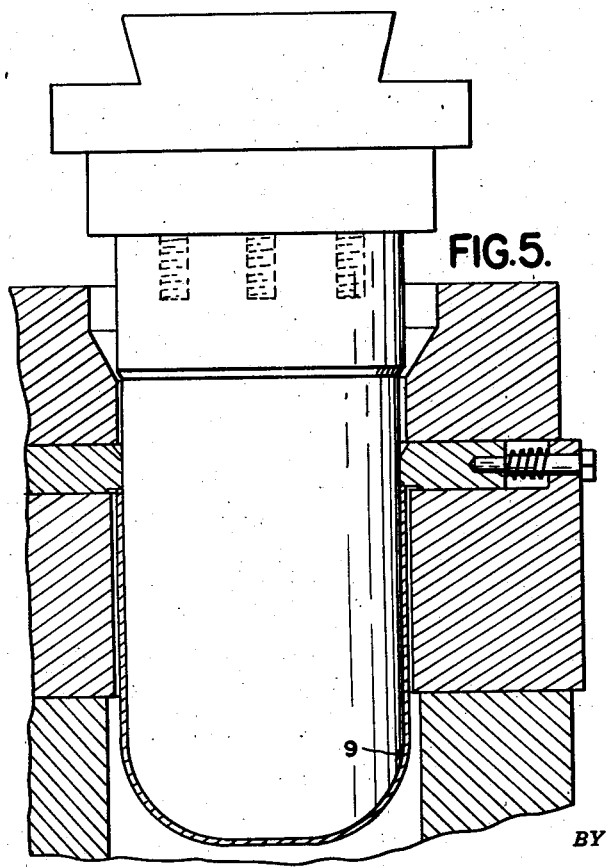
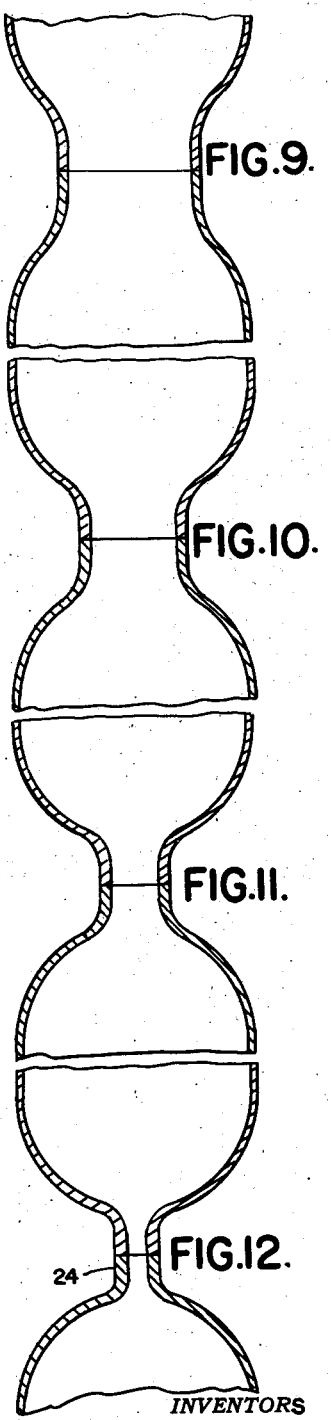
INVENTORS
CHARLES W. SINCLAIR
FRANK H. LeJEUNE
BY
ATTORNEYS

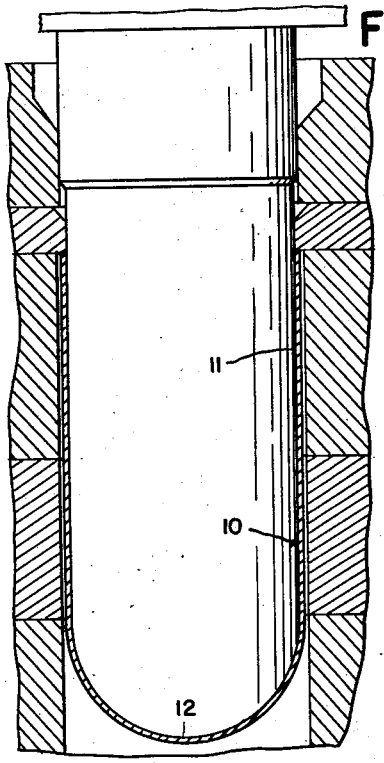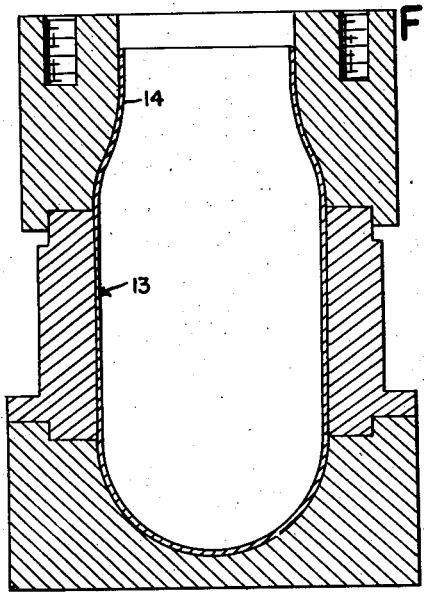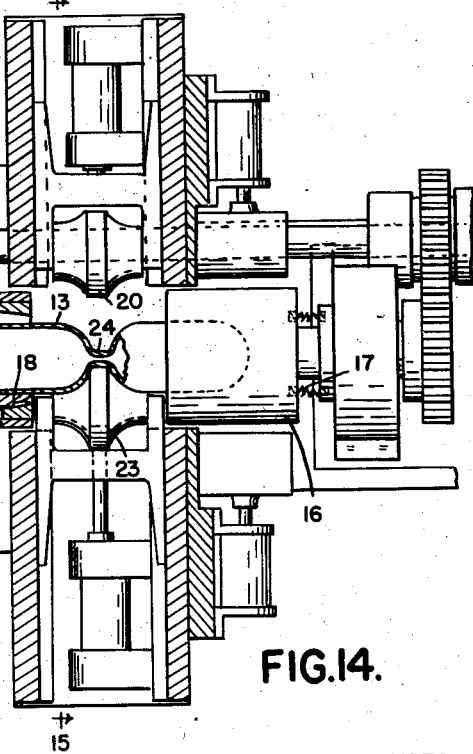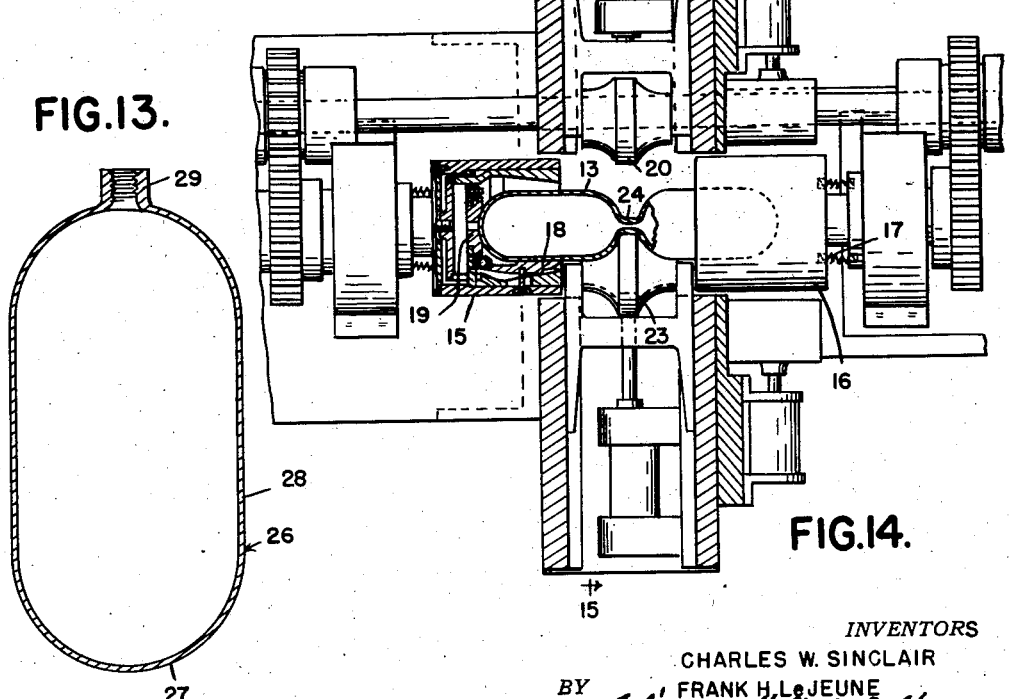

Aug. 11, 1942.  C. W. SINCLAIR ET AL  2,292,669
METHOD OF FORMING CONTAINERS
Filed Oct. 14, 1940  4 Sheets-Sheet 4
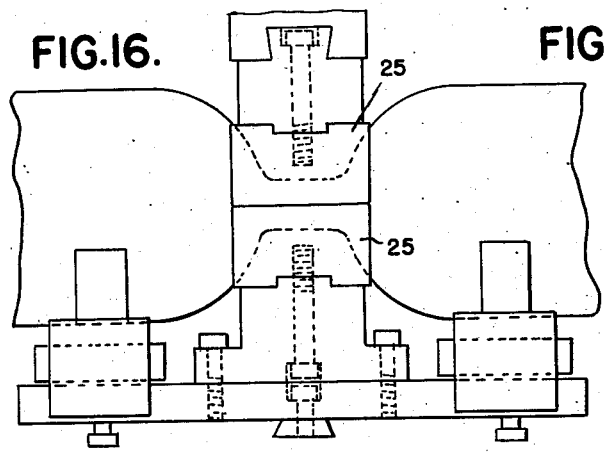
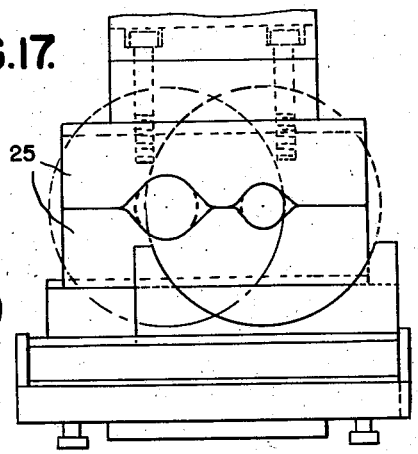
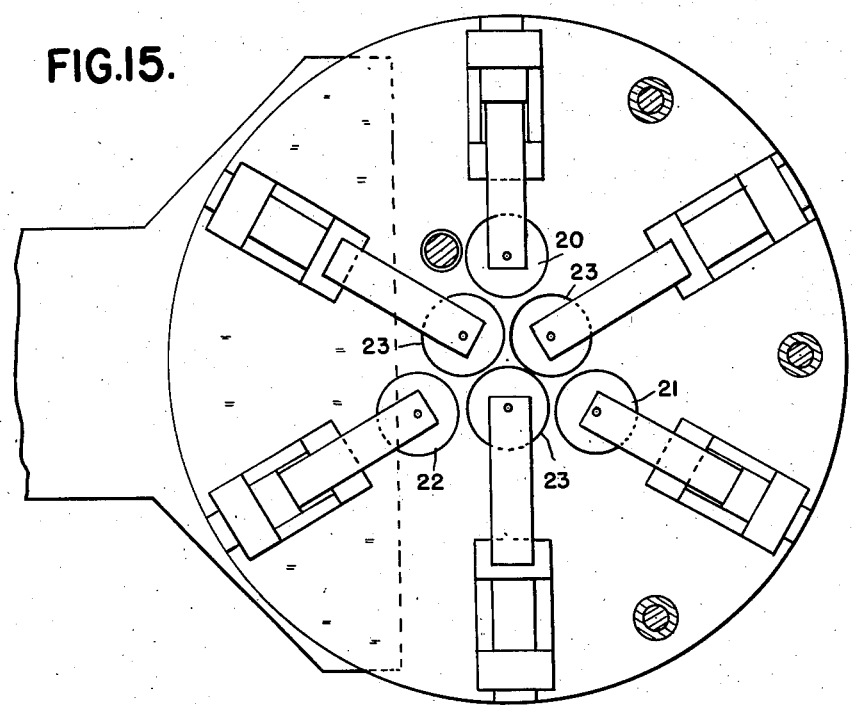
INVENTORS
CHARLES W. SINCLAIR
BY FRANK H. LeJEUNE
ATTORNEYS Patented Aug. 11, 1942

2,292,669

UNITED STATES PATENT OFFICE 2,292,669

METHOD OF FORMING CONTAINERS

Charles W. Sinclair and Frank H. Le Jeune, Detroit, Mich., assignors to Kelsey-Hayes Wheel Company, Detroit, Mich., a corporation of Delaware Application October 14, 1940, Serial No. 361,154

4 Claims. (Cl. 29—148.2)

The invention relates to the manufacture of containers and refers more particularly to the method of forming metal containers designed to hold fluids under relatively high pressure.

The invention has for an object an economical method of manufacturing a container which is formed of material of relatively light weight and great strength and, as a result, is difficult to form.

The invention has for another object an improved method of manufacturing a container free from defects, such as fractures.

The invention has for a further object a method of manufacturing a container whereby oxidation and consequent scaling of the interior surface of the container is limited.

With these as well as other objects in view, the invention resides in the novel features as more fully hereinafter set forth.

In the drawings—

Figure 1 is an edge view of a blank from which the container is formed in accordance with the method embodying the invention;

Figures 2, 3, 4, 5, 6, 7, 8, 9, 10, 11 and 12 are longitudinal sections illustrating successive stages in the forming of the container;

Figure 13 is a longitudinal section illustrating the completed container;

Figure 14 is a sectional view illustrating the manner of operating on the double blank of Figure 8 to form the double blank of Figure 12;

Figure 15 is a cross section on the line 15—15 of Figure 14;

Figures 16 and 17 are views similar to Figures 14 and 15, respectively, illustrating a modified step in the manufacture.

As illustrated in the present instance, the container formed in accordance with the method embodying the invention is a gas cylinder or bottle designed particularly to contain oxygen under relatively high pressure, such as approximately 1800 pounds per square inch.

In the manufacture, the circular flat sheet metal and, more particularly, sheet steel blank 1 of Figure 1 is operated on by suitable dies to bowl same into the blank 2 of Figure 2 having the integral tubular and, more particularly, cylindrical side wall 3 and end wall 4 with the flat portion 5 and the arcuate portion 6 between the flat portion and the side wall.

The bowled blank 2 is then operated on by dies and drawn to form the blank 7 of Figure 3 of greater length and less diameter than the bowled blank. The blank 7 is die-drawn to form the blank 8 of Figure 4 of greater length and less diameter than the blank 7 and then the blank 8 is die-drawn to form the blank 9 of Figure 5 of greater length and less diameter than the blank 8. The arcuate portions of the end walls of the blanks 7, 8 and 9 preferably have the same radius as the arcuate portion 6.

The blank 9 is operated on by dies and drawn to form the blank 10 of Figure 6, the tubular and, more particularly, cylindrical side wall 11 of which is of greater length and less diameter than the tubular side wall of the blank 9. The end wall 12 of the blank 10 is hemi-spherical with a radius greater than the radius of the arcuate portions of the blanks 2, 7, 8 and 9 and equal to the radius of the tubular side wall 11. The diameter of the tubular portion is preferably that of the final or completed container. After the blank 10 is formed the diameter of the open end portion of its tubular side wall is reduced by a suitable operation, preferably using a die, to form the blank 13 as illustrated in Figure 7. The reducing upsets the metal in the portion operated on substantially in accordance with the amount of reduction.

Depending upon the metal and, more particularly, the steel being used, the above steps might be carried out with the metal either hot or cold. If the steps are carried out with the metal cold, annealing might be found desirable before at least certain of the steps. In the present instance, it has been found that the steel being used permits the steps being carried out with the steel cold and that annealing of the blanks 2 and 10 is desirable.

The next step comprises the trimming of the free edges of the reduced end portions 14 of the blanks 13 after which the blanks are placed in opposed axially aligned relation and the trimmed edges of the reduced portions 14 are united or integrated by welding the same together throughout their circumferential extents. After the welding, the outside weld flash is removed by a suitable machining step. At this time, the blank is a double blank illustrated in Figure 8.

The welded reduced end portions of the double blank of Figure 8 are then simultaneously reduced in diameter and upset through the different stages illustrated in Figures 9, 10, 11 and 12. The double blank having the welded reduced end portions heated to a suitable temperature is operated on in an apparatus, as illustrated in Figures 14 and 15. The apparatus comprises the opposed heads 15 and 16 which are urged toward each other under substantially constant pressure as by means of the springs 17. The heads are rotated in unison and have jaws 18 which grip the tubular side walls of the blanks 13 forming the double blank and concave seats 19 which abut the hemispherical end walls of the blanks 13. The heads are spaced a sufficient distance from each other to provide for the feeding inwardly toward the axis of the double blank of the rolls 20, 21, 22 and 23 to reduce the welded end portions to the extents shown in Figures 9, 10, 11 and 12, respectively. As shown, there are single rolls 20, 21 and 22 which are adapted to successively act on the welded reduced end portions and there are three rolls 23 substantially equally spaced about the welded reduced end portions and located between the rolls 20, 21 and 22. The rolls 23 are arranged to be fed inwardly simultaneously so that their pressures will be counterbalanced and the necks 24 upon the blanks forming the double blank will be accurately centered.

Instead of using the rolls 23, the swaging dies 25 may be used to form the necks 24.

After the necks 24 have been formed, the double blank is heat treated to obtain the required physical properties, it being noted that the interior of the double blank is sealed from the ambient atmosphere during the heat treating.

After the heat treating, the necked blanks forming the double blank are separated by severing the necks in the zone of the weld, after which the necessary machining operations, including the internal threading of the necks, are carried out to form the completed container 26 of Figure 13 which is of one piece and has the spherical end wall 27 and the tubular and, more particularly, cylindrical side wall 28 of the same dimensions as the corresponding parts of the blank 13 of Figure 7. The container also has the internally threaded neck 29 having the same outer diameter as the neck 24. It will be noted that the metal progressively increases in thickness from the tubular side wall of the neck. Also, that the inner surface of the container is relatively free of scale inasmuch as the interior of the double blank is sealed from the ambient atmosphere by reason of the continuous weld during the forming of the welded reduced end portions into the neck and also during the heat treating.

What we claim as our invention is:

1. The method of forming containers, comprising the drawing seamlessly from flat sheet metal blanks of tubular blanks, each having an end wall and an integral tubular side wall with an open end portion, welding together the open end portions of a pair of opposed axially aligned blanks and sealing the interiors of the blanks from the ambient atmosphere, reducing the diameters of and upsetting the welded end portions to form necks, and separating the necked blanks by severing the necks in the zone of the weld.

2. The method of forming containers, comprising the drawing seamlessly from flat sheet metal blanks of tubular blanks, each having an end wall and an integral tubular side wall with an open end portion, reducing the diameters of the open end portions, welding together the reduced open end portions of a pair of opposed axially aligned blanks and sealing the interiors of the blanks from the ambient atmosphere, reducing the diameters of and upsetting the welded end portions to form necks, and separating the necked blanks by severing the necks in the zone of the weld.

3. The method of forming containers, comprising the drawing seamlessly from flat sheet metal blanks of tubular blanks, each having an end wall and an integral tubular side wall with an open end portion, welding together the open end portions of a pair of opposed axialy aligned blanks and sealing the interiors of the blanks from the ambient atmosphere, reducing the diameters of and upsetting the welded end portions to form necks, heat treating the necked blanks, and then separating the necked blanks by severing the necks in the zone of the weld.

4. The method of forming containers, comprising welding together throughout their circumferential extents the open end portions of a pair of opposed axially aligned seamless tubular blanks having their other end portions closed, reducing the diameters of and upsetting the welded end portions while heated to form necks, and then separating the necked blanks by severing the necks.

CHARLES W. SINCLAIR.
FRANK H. LE JEUNE.